United States Patent [19]

Stevens et al.

[11] Patent Number: 5,083,517

[45] Date of Patent: Jan. 28, 1992

[54] SOD PLANTING MACHINE

[76] Inventors: Joel H. Stevens, 475 University Dr., Athens, Ga. 30605; Arthur W. Ewing, 2014 Rose Ave., Americus, Ga. 31709

[21] Appl. No.: 663,199

[22] Filed: Feb. 28, 1991

Related U.S. Application Data

[63] Continuation of Ser. No. 447,577, Dec. 7, 1989, abandoned.

[51] Int. Cl.⁵ ............... A01C 11/00; B23D 25/02; B26D 1/56; B26D 1/25
[52] U.S. Cl. .................... 111/104; 111/901; 111/100; 83/331; 83/509; 241/243
[58] Field of Search .......... 111/100, 104, 105, 178, 111/901, 902; 83/331, 509; 241/243; 172/19, 20

[56] References Cited

U.S. PATENT DOCUMENTS

| | | | |
|---|---|---|---|
| 529,796 | 11/1894 | Johnson | 241/243 |
| 2,669,271 | 2/1954 | Treckmann | 241/243 X |
| 2,889,878 | 6/1959 | White et al. | 172/20 X |
| 3,232,255 | 2/1966 | Mitchell | 111/901 X |
| 3,410,350 | 11/1968 | Ware | 172/20 X |
| 3,589,319 | 6/1971 | Peters | 111/901 X |
| 3,672,452 | 6/1972 | Miner | 172/19 |
| 4,043,231 | 8/1977 | Friedberg | 83/408 X |
| 4,119,002 | 10/1978 | Coldiron | 83/147 X |
| 4,162,709 | 7/1979 | Wilson | 172/20 |
| 4,289,080 | 9/1981 | Penley | 111/76 X |
| 4,294,316 | 10/1981 | Hedley et al. | 83/236 X |

FOREIGN PATENT DOCUMENTS

| | | | |
|---|---|---|---|
| 171064 | 4/1952 | Austria | 241/243 |
| 971580 | 7/1975 | Canada | 172/20 |
| 1214508 | 12/1970 | United Kingdom | 111/100 |

Primary Examiner—Danton D. DeMille
Attorney, Agent, or Firm—Hopkins & Thomas

[57] ABSTRACT

A machine for cutting large pieces of sod into smaller, generally square blocks suitable for planting, comprising a cutting mechanism for cutting the large pieces of sod into smaller, generally square pieces of sod which are of generally equivalent size and shape, a discharging means for discharging the smaller pieces of sod onto the ground, and a weighted means to plant the sod into the ground.

11 Claims, 3 Drawing Sheets

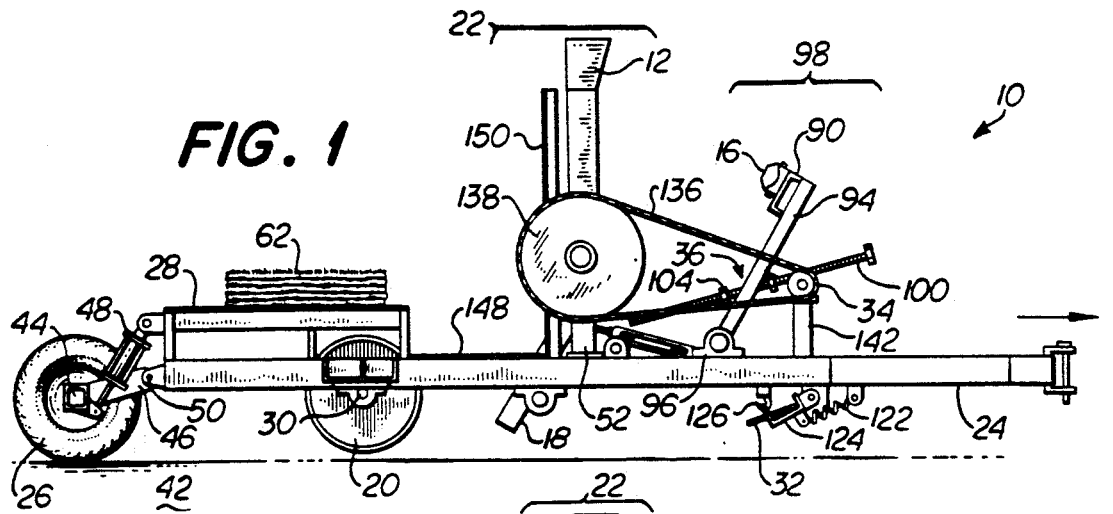
FIG. 1
FIG. 2
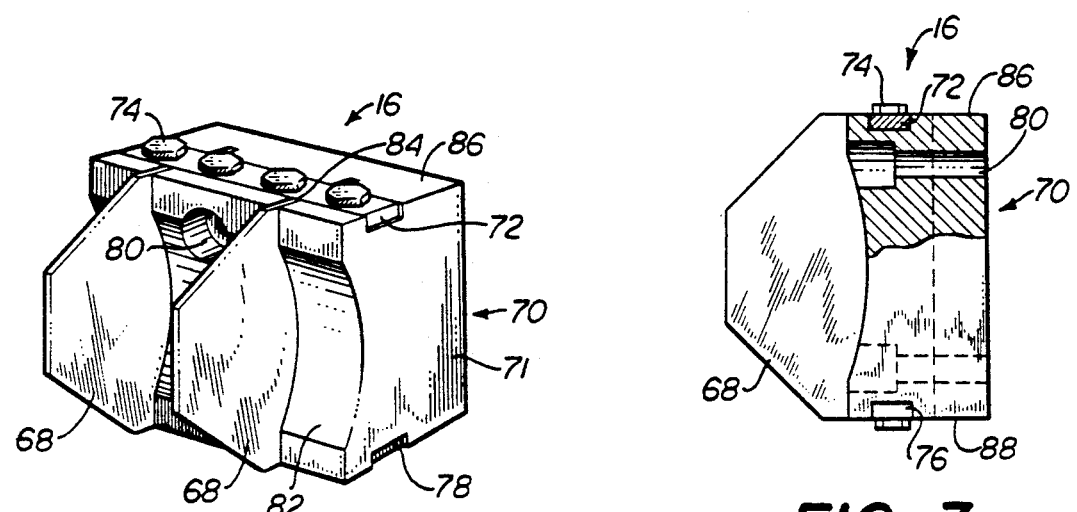
FIG. 4
FIG. 3

SOD PLANTING MACHINE

This is a continuation of copending application Ser. No. 07/447,577 filed on Dec. 7, 1989 now abandoned.

BACKGROUND OF THE INVENTION

1. Field of the Invention

This invention is directed toward a sod planting machine which cuts a larger section of sod into smaller pieces for planting and, more specifically, toward a sod planting machine which cuts a section of sod into pieces of a predetermined size which are then deposited onto the ground and planted by a roller.

2. Prior Art

Various machines have been developed for the cutting and planting of sod. The sod handling machine and method disclosed in U.S. Pat. No. 2,889,878 appears to be one of the first sod cutting machine of the modern era. However, the machine disclosed in this patent has a number of disadvantages, including its inability to handle sods of different thicknesses without manually adjusting the feed chute, its use of saw blades to cut the sod, and the lack of a means for preventing the sod from adhering to the saw blades. Furthermore, the machine disclosed in this patent utilizes two separate cutting means for performing the longitudinal and latitudinal cuts on the sod.

The invention disclosed in U.S. Pat. No. 2,949,083 is directed to a sod plug planter and, more particularly, to a machine which also digs a hole to receive a sod plug and which plants the plug therein. The primary object of this invention is to cut plugs from a larger piece of sod and to insert these plugs into a hole dug by the machine. This invention has several disadvantages, including the need for a hole digging mechanism, which adds extraneous mechanical complexity and weight to the machine, and the potential for an inordinate amount of wasted sod left over from the plug cutting step.

The invention disclosed in U.S. Pat. No. 4,119,002 apparently cuts large sod pieces into smaller sections suitable for planting. Although this device may produce generally square blocks or generally rectangular strips, it has several disadvantages, including the use of several saw-like blades similar to the machine disclosed in U.S. Pat. No. 2,889,878 and the need for two cutting mechanisms in order to produce the square blocks. Therefore, in order to produce the square blocks, this device must use two completely separate and individual cutting mechanisms.

Two other sod planting machines, one of which is based on the other, which cut larger pieces of sod into smaller pieces of sod and then lay the pieces of sod on the ground have been developed. However, both of these machines have the same disadvantages, including having cutting heads which have cutting blades which do not attack the large pieces of sod at right angles, therefore increasing the instances of jamming of the machines. Additionally, these machines do not introduce the large pieces of sod at a zero degree angle relative to vertical, thus also resulting in increased instances of jamming. Furthermore, these machines do not incorporate pivoting assemblies for repair and cleaning ease, buster bars for preliminary ground preparation, and hydraulic transportation wheels for ease of transportation and operation.

BRIEF DESCRIPTION OF THE INVENTION

The present invention overcomes the foregoing and other disadvantages of the prior art by providing a novel and improved device for cutting large sod pieces into smaller, generally square sections suitable for planting. For example, the present invention, by cutting generally square blocks, does not produce any wasted sod. Additionally, the novel mechanism of the present invention employs a single cutting mechanism in order to produce the generally square sections of sod rather than two or more independent cutting mechanisms. Furthermore, in contrast to a hole digger, the present invention incorporates a roller for forcing the sod into the ground, thus reducing the need for mechanical mechanisms, and also reducing the weight, thus eliminating two disadvantages of the prior art. The present invention also utilizes a novel sod cutting mechanism which does not incorporate any saw blades, therefore decreasing the risk of danger inherent in the use of sharp objects, such as saw blades.

The sod cutting device of this invention comprises one or more feed chutes in which large pieces of sod are placed and directed toward the cutting mechanism. Gravity is used to force the large pieces of sod against the sod cutting mechanism. The sod cutting mechanism comprises a rotatable drum and a plurality of flat blades which force the sod against the sod cutting vanes and directional head.

As the large pieces of sod are forced by gravity against the rotating drum of the sod cutting mechanism, the flat blades, which are attached to the drum in a predetermined pattern, force the sod against the sod cutting vanes and directional head. As the sod is pressed against the sod cutting vanes, the sod is sheared into generally small square pieces of sod which are then directed through and between the sod cutting vanes and directional head into the delivery chute. The generally small square pieces of sod slide down the delivery chute in a predetermined pattern onto the ground. A planting roller then rolls over the pieces of sod previously placed on the ground and forces the pieces of sod into the ground, thus planting the sod.

In general, the present invention generates from rectangular blocks of grass uniform plugs of sod which are approximately two inches by two inches and which are deposited in a generally uniform grid pattern onto the ground. The invention is pulled by a farm tractor and utilizes the tractor power train output for power and the tractor hydraulics to engage and disengage hydraulically operated transportation wheels. By virtue of the action of gravity and the cutting mechanism of the invention itself, the large pieces of sod are forced through a cutting mechanism comprising a power driven cylindrical roller upon which cutting blades are welded. The cutting blades strike the large piece of sod on the grass side of the sod and force the sod through a separate mechanism comprising a series of machine blocks with concave radius surfaces interrupted by a series of vanes. The action of the rotating cylindrical roller passes the cutting blades through the cutting vanes and above the concave radius face surface of the machine blocks, thus providing a shearing action between the cutting blades and the cutting vanes. Depending on the lengths of the cutting vanes and the distance between neighbor cutting vanes, different size plugs of sod are produced. Gravity then forces the plugs downward into a directional chute means whereupon the smaller plugs of sod are deposited on prepared ground.

Prior to the deposition of the plugs onto the ground, the soil is prepared by a spring loaded buster bar positioned forward of the cutting mechanism and at about a thirty degree (30°) angle to the cutting mechanism. The grass is planted by virtue of being rolled over with a roller upon which the full weight of the machines bears. The roller forces the plugs of grass into the ground. Power to the cylindrical rollers is provided by the tractor power train output and drive gear box. Hydraulically pivotable transportation wheels attached to the rear of the invention allow the invention to be hauled over land and to move or turn the invention at end of each row after the row has been prepared.

In this manner, the invention comprises simple mechanical devices to cut large pieces of sod into generally smaller square pieces of sod, to direct these sod into a predetermined pattern on the ground, and to plant the sod by way of a roller forcing the sod into the ground.

It is accordingly an object of the present invention to provide a novel sod cutting machine for severing large pieces of sod into generally smaller, square pieces.

It is another object of the present invention to provide a novel sod cutting machine which does not use saw blades in order to cut the larges pieces of sod into the relatively smaller, square pieces.

It is a further object of the present invention to provide a novel sod cutting machine which reduces plugs and jams in the machine.

It is a further object of the present invention to provide a novel sod cutting machine which can cut large pieces of sod into smaller generally square pieces by using single cutting mechanism.

It is yet another object of the present invention to provide a novel sod cutting machine which incorporates a gravity feed mechanism for the large pieces of sod and which can handle several different thicknesses of sod without manual adjustment.

It is still a further object of the present invention to provide a sod cutting machine which is inexpensive to manufacture, simple to operate, and which effectively places small pieces of sod at regular intervals in the earth's surface.

Other objects, features and advantages will become apparent to one skilled in the art after studying the following specification considered in light of the following drawings in which like numerals depict like components throughout the various figures.

BRIEF DESCRIPTION OF THE DRAWINGS

FIG. 1 is a side elevation of the invention in its transportation mode.

FIG. 2 is a side elevation of the invention in its sod cutting and planting mode.

FIG. 3 is a side elevation, partly in section, of the sod cutting vane and directional head.

FIG. 4 is perspective view of the sod cutting vane and directional head which is shown partly in section in FIG. 3.

DETAILED DESCRIPTION OF A PREFERRED EMBODIMENT

Figure 5:
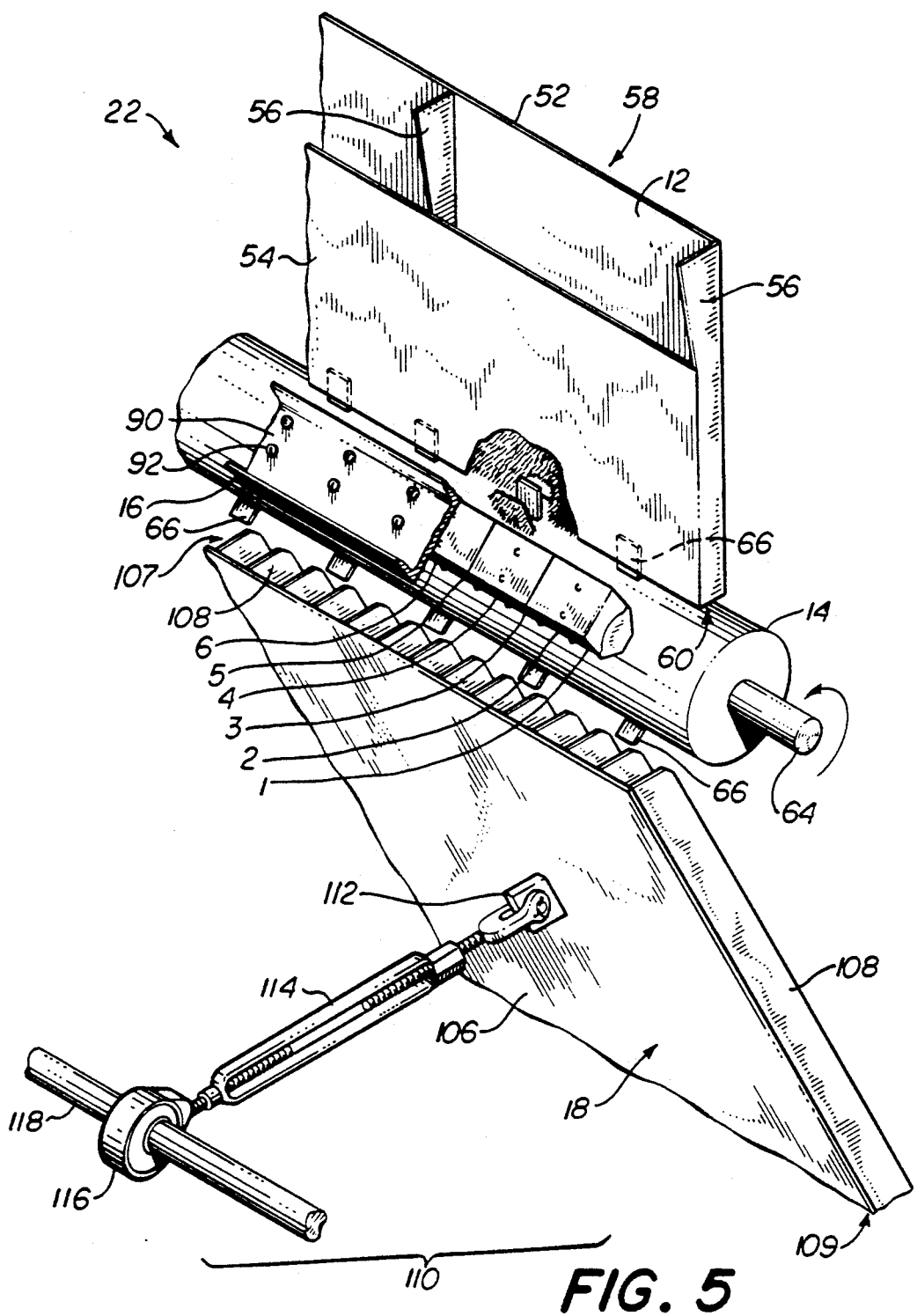
FIG. 5 is a perspective view of the sod feeding chute, sod cutting mechanism, sod cutting vane and directional head, and sod delivery chute mechanism of the invention.
Figure 6:
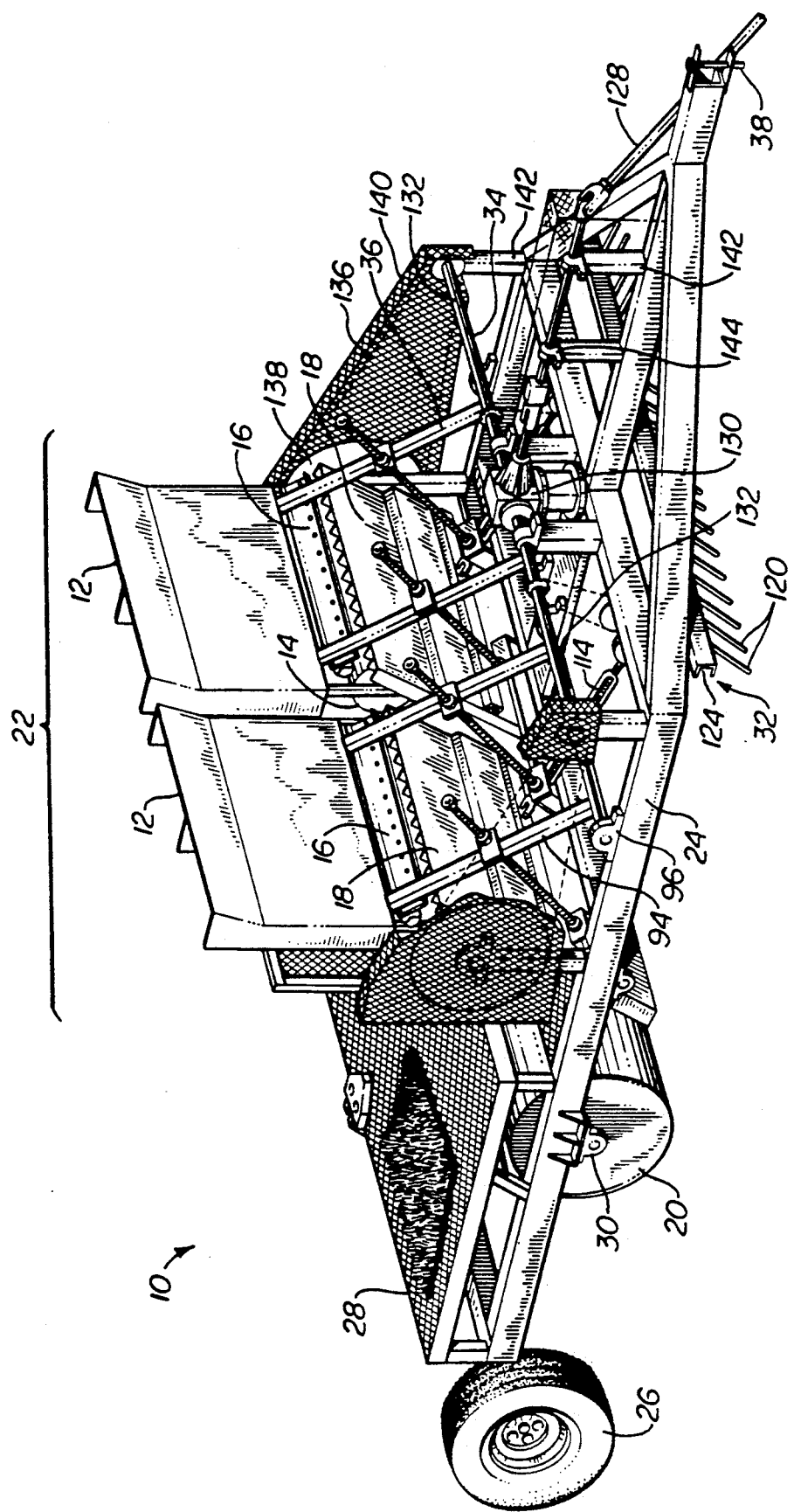
FIG. 6 is a perspective view of the invention.

The sod cutting machine of this invention, denoted generally by the number 10 in FIGS. 1, 2 and 6, comprises, in general, feed chutes 12, cutting blade drums 14, cutting vane and directional heads 16, directional chutes 18, and planting roller 20. The above components with the exception of the planting roller 20 comprise the basic cutting mechanism 22, more clearly shown in detail in FIG. 5, of this invention.

The cutting mechanism 22 is mounted onto a trailer assembly 24 comprising transportation wheels 26, large sod piece storage platform 28, planting roller 20, axle support means 30, ground disturbance means or buster bar 32, the cutting blade drums 14 drive mechanism which is indicated generally by the number 34, and the cutting vane and directional heads 16 support and pivot mechanisms which are indicated generally by the number 36. The trailer assembly 24 may be of any suitable type and is illustrated in example by comprising a generally rectangular hollow beam frame work having a plurality of cross members used to support the various mechanisms of this invention. At the proximal end of the trailer assembly 24 is a conventional trailer hitch 38 used to attach the invention 10 to any suitable pulling means (not shown).

At the distal end of the trailer assembly 24, that is the end of the trailer assembly 24 opposite the trailer hitch 38, are located the transportation wheels 26. The transportation wheels 26 are attached to the trailer assembly 24 in a manner such that, in its transportation mode, the transportation wheels 26 may be lowered such that the directional chute 18, planting roller 20, and ground disturbance means 32 will not contact the ground during transportation. In its planting operation, the transportation wheels 26 are raised by a mechanism such that the invention 10 is supported on the ground by planting roller 20, therefore allowing the full weight of the invention 10 to be carried by planting roller 20 to be imparted to the small pieces of sod 40 previously delivered to the ground, thus planting the small pieces of sod 40. An example of one such mechanism comprises an axle 44, holding the transportation wheels 26, which is pivotally attached to the trailer assembly 24 by means of support arms 46. A hydraulic piston 48 is attached to axle 44 and, when operated, will raise and lower axle 44 and transportation wheels 26 pivotally around the support arm 46 connecting pins 50.

Referring now to FIGS. 1, 2 and 5, the cutting mechanism 22 is centrally located on the trailer assembly 24. One or more feed chutes 12 are supported on the frame work of the trailer assembly 24 by chute support standings 52. Feed chutes 12 generally consist of a rear wall 52, a front wall 54, and two or more intergerally formed extending side walls 56 connecting front wall 52 and rear wall 54 so as to form a generally hollow, rectangular box-like feed chute 12. The top end of each feed chute 12, denoted by the number 58, and the bottom end of each feed chute 12, denoted by the number 60, are open and provide access for the introduction of the large pieces of sod 62 into the feed chutes 12 through the top end 58 and egress for the delivery of the large pieces of sod 62 to the cutting blade drum 14 and cutting vane and directional head 16 through the bottom end 60, respectively. The large pieces of sod 62 are gravity fed through feed chutes 12 and directed in a predetermined direction through feed chute 12 by front wall 52, rear wall 54, and side walls 56 to and out bottom ends 60. When exiting feed chutes 12 through bottom end 60, the large pieces of sod 62 come in contact with cutting blade drums 14, located immediately below the bottom ends 60 of the feed chutes 12.

Cutting blade drums 14 further comprise drum axles 64 to allow cutting blade drums 14 to rotate about drum axles 64 axis. Cutting blades 66 are attached to cutting blade drum 14 in a unique predetermined pattern which allows the cutting of small pieces of sod 40 from the large pieces of sod 62. Cutting blades 66 are positioned in three rows spaced evenly around cutting blade 14 at 120 degree intervals, with one third of the cutting blades 66 located along each row. The cutting blade 66 are positioned along each row in such a pattern that each cutting blade 66 along each row corresponds to every third directional slot, defined by the spaces between neighboring cutting vanes 68, on cutting vane and directional head 16. In other words, the cutting blades 66 along the first row of blades on cutting blade drums 14 correspond to directional slots 1, 4, etcetera of cutting vane and directional heads 16; the cutting blades 66 along the second row of cutting blades on cutting blade drums 14 correspond to directional slots 2, 5, etcetera of cutting vane and directional head 16; and cutting blades 66 along the third row of cutting blades on cutting blade drums 14 correspond to directional slots 3, 6, etcetera of cutting vane and directional head 16.

Although this pattern has been determined to be the optimum pattern, other patterns may be used for different situations. For example, one row of cutting blades 66 may be used with all the cutting blades along that row, two rows of cutting blades 66 may be used with half of the cutting blades along each row, etcetera, or any combination of cutting blades 66 and rows may be designed for various needs. In general, the cutting blades are welded onto the cutting blade drum 14.

Cutting blades 66 force the lower end of the large pieces of sod 62 extending through the bottom end 60 of the feed chutes 12 against the cutting vane and directional heads 16. Referring now to FIGS. 3 and 4, the best mode for the cutting vane and directional heads 16 comprise two cutting vanes 68, mounting block 70, two lock strips 72, and eight lock strip mounting bolts 74. Each cutting vane 68 comprises a generally trapizoidal cutting vane proximal end which is intergrally attached to a generally rectangular mounting plate portion on the distal end, thus forming a generally planar component. On both edges of the mounting plate portion of the cutting vane 68 is a notch 76 used for securing the cutting vane 68 to the mounting block 70. The notches 76 are located opposite each other across the genrally rectangular mounting plate portion of the cutting vane 68.

Mounting blocks 70 are generally solid rectangular components comprising two mounting slots 78, two mounting bolt holes 80, two cutting vane 68 mounting slots 84, eight lock strip mounting bolt holes (not shown), and a concave directional face 82. The cutting vane mounting slots 84 are cut through concave directional face 82 into mounting block 70. The cutting vane mounting slots 84 are located on the concave directional face 82 parallel to the side edges 71 of the mounting blocks 70 and about one quarter of the way in along the concave directional face 82 from each side edge 71. Cutting vane mounting slots 84 extend from the top surface 86 of the mounting block 70 to the bottom surface 88 of the mounting block and are perpendicular to the top surface 86 and the bottom surface 88. Furthermore, cutting vane mounting slots 84 extend into the mounting blocks 70 to such a distance such that the cutting vane mounting slots 84 intersect with and extend beyond mounting block mounting slots 78.

Cutting vanes 68 are inserted into cutting vane mounting slots 84 such that cutting vane notches 76 lines up with mounting block mounting slots 78 when cutting vanes 68 are in proper position in the mounting blocks 70. When cutting vanes 68 are in proper position on the mounting blocks 70, the cutting vanes 68 extend outwardly from and normal to the concave directional face 82, perpendicular to the top surfaces 86 and the bottom surface 88, and in planes parallel to the other cutting vanes 68. Lock strips 72 are placed within mounting block mounting slots 78 such that lock strips 72 also engages cutting vane 76. Lock strips 72 are bolted into place onto the mounting blocks 70 using lock strip mounting bolts 78. In its proper orientation, lock strips 72 will lock cutting vanes 68 into cutting vane mounting slots 84 and will hold the cutting vanes 68 securely on the mounting blocks 70.

A plurality of cutting vane and directional heads 16 are used on the invention 10. In this example mode, two sets of thirteen removable cutting vane and directional heads 16 are used, one set corresponding to one set of feed chutes 12 and cutting blade drum 14, and another set corresponding to a second set of feed chutes 12 and cutting blade drum 14. The attitude of the cutting vane and directional heads 16 is approximately forty-five degrees (45°) relative to the vertical when the cutting vane and directional heads 16 are in the cutting position. This angle places the upper edge of each cutting vane 68 in a vertical position and the lower edge of each cutting vane 68 in a horizontal position. As more fully described later, the sod moves into cutting position at a zero degree (0°) angle relative to the vertical, or parallel to the upper edges of the cutting vanes 68. The sod is then forced by the cutting blades 66 onto the cutting vanes 68 and sheared into the smaller squares or predetermined size. The cutting vane and directional heads 16 are mounted onto beams 90 in any conventional manner, for example, by using bolts (not shown) inserted through mounting bolt holes 80 and secured using nuts 92. In turn, the cutting vane and directional heads 16 and beam 90 components are mounted onto pivot arms 94 in any conventional manner, such as welding.

Pivot arm 94 is pivotably attached to the trailer assembly 24 by a pivot arm support means 96. The entire cutting vane and directional heads 16, beam 90, and pivot arm 94 assembly, denoted generally as vane assembly 98, can pivot through a predetermined arch such that in one extreme position the vane assembly 98 is in its sod cutting position and is located in close proximity to or in contact with cutting blade drum 14, and in its extreme opposite position the vane assembly 98 is moved away from the cutting mechanism 22 such that vane assembly 98 is accessible for cleaning and repair. Pivoting mechanism 100 is pivotably attached to the trailer assembly 24 at pivot mechanism support means 102. Furthermore, pivoting mechanism 100 also is slideably attached to pivot arm 94 such that when pivoting mechanism 100 is moved in one direction, it forces the vane assembly 98 into its cutting position and when pivoting mechanism 102 is moved in the opposite direction, it forces the vane assembly 98 into its open and cleaning position. Locking nuts 104 located on screw threads present on the outer surface of pivoting mechanism 100 may be tightened against pivot arm 94 so as to lock pivot arm 94 to pivoting mechanism 100, thus holding pivot arm 94 in its cutting position.

Referring now to FIG. 5, the directional chutes 18 are located directly below the cutting vane drums 14 and the feed chutes 12. Directional chutes 18 comprise a generally flat slide portion 106 and a plurality of intergrally formed perpendicularly extending side walls 108 which are equadistantly spaced from and parallel to each of the other side walls 108. Side walls 108 extend vertically along the length of the slide 106 from the top edge 107 to the bottom edge 109 of directional chute 18. The individual directional chutes defined by side walls 108 and slide 106 correspond with the individual chutes located between cutting vanes 68 described previously such that the small pieces of sod 40, after being cut by cutting blades 66 and cutting vane 68, are forced through the individual vane directional chutes by the cutting blades 66 and into the individual directional chutes formed by side walls 108 and slide 106 located on directional chute 18. The bottom edges 109 of directional chutes 18 extend below the trailer assembly 24 but do not contact the ground.

Directional chute 18 also is connected to the cutting blade drum drive mechanism 34 by attachment means 110. Attachment means 110 comprises anchor support 112, extendable anchor 114 pivotably attached to anchor support 112, and elliptical roller bearing 116 located on cam rod 118. Cam rod 118 is driven by the cutting blade drum drive mechanism 34 through a system of, for example, pulleys or gears and fan belts or chains (not shown) such that when cam rod 118 is rotated, elliptical roller bearing 16 causes extendable anchor 114 to move in a generally back and forth motion along the axis of extendable anchor 114, thus imparting a generally back and forth motion to directional chute 18 when the invention 10 is in operation. The purpose of this motion is to reduce the tendency for the small pieces of sod 40 to jam in the directional chute 18.

Ground disturbance means or buster bar 32 is attached to the trailer assembly 24 and is located forward of the cutting mechanism 22 and comprises grading teeth 120, spring 122, grading teeth support 124, and retaining hook 126. Grading teeth 120 are supported along predetermined intervals by grading teeth support 124 and, when in operation, are located generally at a thirty degree (30°) angle from vertical such that grading teeth 120 contact the ground, thus disturbing the ground and facilitating planting of the small pieces of sod 40. The ground disturbance means is spring biased by spring 122 for two reasons. First, spring 122 pulls the grading teeth support 124 into the correct position for disturbing the ground and retains it in this position and, second, the spring bias allows the ground disturbance means to pivot backwards upon contact with a solid obstruction, thus preventing damage to the ground disturbance means 32.

In its closed or stored mode, the ground disturbance means 32 is lifted upwards and backwards away from the ground, thus extending spring 122, and is hooked onto retaining hook 126. In this mode, the ground disturbance means 32 will not contact the ground. Ground disturbance means 32 is put into its closed mode when the invention 10 is being transported or when it is not necessary to disturb the ground prior to planting of the small pieces of sod 40. One large or a plurality of smaller ground disturbance means 32 may be used.

Planting roller 20 is a generally cylindrical drum which is mounted onto the trailer assembly 24 by axle support means 30 at a predetermined distance behind the lowest extending portion of directional chutes 18. When the invention 10 is being used for planting small pieces of sod 40, the planting roller 20 contacts the ground immediately behind directional chutes 18 such that when the small pieces of sod 40 are deposited onto the ground, the planting roller 20 will roll over the small pieces of sod 40, thus forcing them into the ground. The weight of the invention 10 generally is enough weight for the planting roller 20 to work efficiently. However, planting roller 20 may be filled with a weighting means such as water so as to provide more weight.

The cutting blade drum drive mechanism 34 is similar to the drive mechanism of a conventional automobile. The drive shaft assembly 128 is attached to the drive shaft outlet of a common tractor (not shown). The end of the drive shaft assembly 128 opposite the power source enters a conventional differential gearing system 130 for the perpendicular transference of rotation to transfer the rotation of drive shaft assembly 188 to drive axles 132. At the far ends of drive axles 132, that is, the ends distal from gearing system 130, are pulley wheels or cogs 134. A fan belt 136 or other connecting mechanism connects pulley wheels or cogs 134 to corresponding cutter pulley wheels or cogs 138 on the cutting blade drum 14, thus providing for the rotation of the cutting blade drum 14. An optional safety cage 14 can be located about the pulley wheels or cogs 134, the cutter pulley wheels or cogs 138 and the fan belt 136. The cutting blade drum drive mechanism 34 is supported on the trailer assembly 24 forward of the cutting mechanism 22 by the use of various struts 22 and roller bearings 144. Attached to the drive axles 132 are gears or cams 146 for the attachment of fan belts or chains (not shown) to drive the extendable anchor 114.

In its transportation mode, the invention 10 is attached to a pulling means, such as a truck or a tractor, using the trailer hitch 38. The transportation wheels are put in their lowest position using hydraulic piston 48 thus lifting the trailer assembly such that planting roller 28 does not contact the ground. The ground disturbance means 32 is lifted into its closed position by hooking the grading teeth support 124 onto retaining hook 126. Vane assembly 98 can be rotated to its open position away from the cutting blade drum 14 so that no damage will be caused to the cutting vanes 68 or the cutting blade drums 14 due to vibrations upon movement.

In its planting mode, the invention 10 is attached to a pulling means, such as truck or a tractor, by trailer hitch 38. The transportation wheels 26 are raised by hydraulic piston 48, thus lowering the trailer assembly 24 such that it is supported by the planting roller 20 and the transportation wheels 26 can be raised to such a height that they do not touch the ground. The ground disturbance means 32 is lower into its proper operating position by unhooking the grading teeth support 124 from the retaining hook 126. Spring 122 pulls the ground disturbance means 132 into its proper position generally thirty degrees (30°) from vertical with grading teeth 120 contacting the ground. As previously mentioned, due to its spring mounted characteristic, ground disturbance means 32 will pivot backwards if it encounters an obstruction, such as a rock, thus preventing damage to the grading teeth 120, the grading support 124, and the entire ground disturbance means 32.

Large pieces of sod 62 are loaded onto large sod piece storage platform 28. The cutting vane and directional head pivot and support mechanism 38 is rotated to its cutting position by forcing the pivoting mechanism 100 toward the cutting mechanism 22 and locking the pivoting mechanism 100 relative to the vane assembly 98 using locking nuts 104. In this position, the pivot arm 94 forces the cutting vane and directional heads 16 to their closest position to the cutting blade drum 14. In this position, the cutting vanes 68 extend along and fill the arc defined by the rear wall 54 of the feed chutes 12 and the upper edges 107 of the directional chutes 108 and the planes of the cutting vanes 68 correspond to the planes of the side walls 108 of directional chutes 18. In other words, the individual vane chutes and the individual directional chutes cooperate to form a continous chute down which the sheared smaller pieces of sod are forced until they fall by gravity down the directional chute 18. The cutting blades 66, when rotated along with cutting blade drums 14, will travel through the individual vane chutes defined by the cutting vanes 68 and the top ends of the individual directional chutes defined by side walls 108 and slide 106 of directional chutes 18.

The operator (not shown) stands on operator platform 148 and, as the invention 10 is pulled along behind the pulling means, feeds the large pieces of sod 62 into the top ends 58 of feed chutes 12. Optional safety wall 150 prevents the operator from accidently inserting any digits, limbs, other body parts, or other materials into the cutting mechanism 22. The operator places the large pieces of sods 62 within feed chutes 12 in the space defined by front wall 52, rear wall 54 and side walls 56. Gravity forces the large pieces sod 62 down through feed chutes 12, out the bottom end 60 and against the cutting blade drums 14.

Drive shaft 128 transmits its rotation received from the drive shaft outlet of the pulling means to drive axles 132, which in turn transmit their rotation through pulley wheels or cogs 134, fan belt 136, and cutter pulley wheels or cogs 138 to the cutting blade drums 14. As cutting blade drums 14 rotate, cutting blades 66 force the end of the large piece of sod 62 extending through the bottom ends 60 of the feed chutes 12 against the cutting vane and directional heads 16, thus cutting off or shearing off generally small square pieces of sod 40 of the same general size and shape. The small pieces of sod 40 are forced through the individual vane chutes defined by the neighboring cutting vanes 68 by the cutting blades 68. It is necessary for the face of the mounting blocks 70, located between the cutting vanes 68, to be concave, thus forming the concave directional face 82, so as to accommodate the equatorial motion of the cutting blades 66 in their circular travels with cutting blade drums 14.

The small pieces of sod 14 sheared off of the larger pieces of sod 62 due to the shearing action created when the cutting blades 66 pass between the cutting vanes, forcing the sod to shear at the intersection of the cutting blades 66 and the cutting vanes 68, are forced through the individual vane chutes, defined by neighboring cutting vanes 68, by the cutting blades 66 and into the individual directional chutes, defined by side walls 108 and slide 106, on directional chute 18. Due to the motion of the cutting blade drums 14, the small pieces of sod 40 are forced onto the directional chute 18 with the blades of grass facing upward away from the slide 106. The small pieces of sod 40 are forced by gravity down the individual directional chutes, defined by side walls 108 and slide 106, and are deposited onto the ground. To assist the small pieces of sod 40 in their travels down the directional chutes 18, the directional chutes 18 are driven back and forth by the attachment means 110 in a manner previously described. Cam rod 118 is driven, by pulleys or gears and fan belts or chains, by drive axles 132. Attached to cam rod 118 is elliptical bearing 116 which, when rotated by cam rod 118, defines an elliptical path forcing extendable anchor 114 back and forth. This back and forth motion of extendable anchor 114 is imparted to directional 118 through anchor support 112, causing a shaking motion to be imparted to directional chutes 18, thus assisting the small pieces of sod 40 downward to the ground.

As the small pieces of sod 40 exit the lower end of directional chutes 18, the forward motion of the invention 10 causes the planting roller 20 to roll over the small pieces of sod 40, thus planting the sod by forcing the small pieces of sod 40 into the ground. At this point, approximately one third of the ground is covered by the small pieces of sod in a generally checkerboard fashion.

While the best mode of the invention has been shown and described herein, it will be readily apparent to those skilled in the art that many modifications may be made to the invention without departing from the spirit and the scope of the invention as defined in the following claims.

What is claimed is:

1. A machine for cutting conventional strips of sod into smaller generally square pieces of sod and planting said smaller generally square pieces of sod in situ, comprising:
   a. a framework;
   b. means for feeding conventional strips of sod in a predetermined path of sod movement;
   c. a cutting mechanism in the path of sod movement for progressively severing the leading edge of the conventional strips of sod into smaller squares of sod, comprising a plurality of flat, generally square cutting blades located in a predetermined pattern on a generally cylindrical drum means for rotating said cutting blades and a plurality of cutting vanes located in a predetermined pattern on a support means for interacting with said cutting blades, wherein said drum is rotatably attached to said framework and, upon rotation of said drum, said cutting blades rotate between adjacent pairs of cutting vanes, said support means being generally stationary relative to said drum when said machine is in operation;
   d. a discharge cut means for discharging by gravity said smaller squares of rod onto the ground; and
   e. a planting means separate from said discharge cute means for forcing the smaller square pieces of sod into the ground so that they are planted, said planting means comprising a generally cylindrical drum axially mounted horizontally to said framework perpendicular to the direction of travel of said machine.

2. The machine as described in claim 1, wherein said drum means comprises a rotation axle, wherein said generally square blades are integrally attached to said drum in predetermined rows and at said predetermined integrals.

3. The machine as described in claim 2, wherein said generally square blades are located in at least two rows of blades on said drum wherein:

a. each of said rows comprises an equal number of said generally square blades;
b. said rows are spaced in equal distance from each other around the circumference of said drum; and
c. said generally squared blades are spaced a predetermined distance from each other along said rows.

4. The machine as described in claim 2, wherein said support means comprises at least one cutter head which comprises at least one of said cutting vanes and a mounting block for supporting said cutting vanes, wherein said cutting vanes are spaced equadistant and parallel to each other along the face of said mounting block such that said generally square blades may rotate through the spaces between said cutting vanes.

5. The machine as described in claim 4, wherein the face of said mounting block is generally concave in relation to the circumference of said drum.

6. The machine as described in claim 1, further comprising
means for rotating said drum in a direction such that said cutting blades contact the large piece of sod; wherein
said cutting blades are flat, generally square cutting blades;
said cutting vanes are equadistant from and parallel to each other along said support means such that said cutting blades may rotate through the spaces between said cutting vanes;
said cutting blades force the sod against said cutting vanes so as to cut generally small square pieces of sod from the large piece of sod; and
said cutting blades force said generally square pieces of sod between said cutting vanes and into said discharge chute.

7. The machine as described in claim 6, wherein said discharge chute comprises a plurality of side walls integrally attached normal to said discharge chute forming a plurality of subchutes, said side walls corresponding to said cutting vanes, said subchutes providing a means for discharging said smaller squares of sod onto the ground in a predetermined pattern.

8. The machine as described in claim 1, wherein said discharge cute vibrates back and forth.

9. The machine as described in claim 1, further comprising means for disturbing the ground prior to the discharging of the small pieces of sod onto the ground.

10. The machine as described in claim 1, mounted on a trailer assembly comprising a support frame, a trailer hitch, and transportation wheels.

11. The machine as described in claim 10, wherein;
a. said support frame further comprises a large sod piece storage platform and an operator platform; and
b. said transportation wheels are pivotably mounted onto said trailer assembly such that said transportation wheels may be rotated upwards such that they are not in contact with the ground.

* * * * *